(12) United States Patent
Kimura

(10) Patent No.: US 11,388,015 B2
(45) Date of Patent: Jul. 12, 2022

(54) INFORMATION PROCESSING DEVICE AND METHOD OF CONTROLLING INFORMATION PROCESSING DEVICE

(71) Applicant: CANON KABUSHIKI KAISHA, Tokyo (JP)

(72) Inventor: Tomohiro Kimura, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 16/887,624

(22) Filed: May 29, 2020

(65) Prior Publication Data

US 2020/0396094 A1 Dec. 17, 2020

(30) Foreign Application Priority Data

Jun. 17, 2019 (JP) .............................. JP2019-112198

(51) Int. Cl.
*H04L 12/12* (2006.01)
*H04L 67/56* (2022.01)
*H04L 47/32* (2022.01)
*H04N 1/00* (2006.01)

(52) U.S. Cl.
CPC .............. *H04L 12/12* (2013.01); *H04L 47/32* (2013.01); *H04L 67/28* (2013.01); *H04N 1/00896* (2013.01)

(58) Field of Classification Search
CPC ...................................................... H04L 12/12
USPC ......................................................... 358/1.13
See application file for complete search history.

(56) References Cited

U.S. PATENT DOCUMENTS

| 10,248,185 B2 | 4/2019 | Okazawa et al. |
| 2012/0191989 A1* | 7/2012 | Michishita ............ G06F 1/3284 713/300 |
| 2014/0164807 A1* | 6/2014 | Okazawa ........... H04N 1/32032 713/323 |

FOREIGN PATENT DOCUMENTS

JP 2014113709 A 6/2014

* cited by examiner

*Primary Examiner* — Jacky X Zheng
(74) *Attorney, Agent, or Firm* — Carter, DeLuca & Farrell LLP

(57) ABSTRACT

A controller of an information processing device receives a packet via the network interface and performs a process corresponding to the received packet when the information processing device operates in the first power mode. The network interface performs a process of transmitting the received packet to the controller when the information processing device operates in the first power mode, and performs a process of discarding the received packet or the process of transmitting the received packet to the controller when the information processing device operates in the second power mode. The network interface has a storage area in which a discarding determination pattern is stored. The controller performs a process of updating a list of the discarding determination pattern to be stored in the network interface based on determination of whether a process on the received packet in the controller is a discarding process.

18 Claims, 6 Drawing Sheets

INFORMATION PROCESSING DEVICE AND METHOD OF CONTROLLING INFORMATION PROCESSING DEVICE

BACKGROUND OF THE INVENTION

Field of the Invention

The present invention relates to an information processing device and a method of controlling the information processing device.

Description of the Related Art

In information processing devices such as printers or digital multi-function peripheral, there are high requests for reducing power consumption. As a technology for meeting the request, for example, a technology for causing a power mode of an information processing device to transition from a normal power mode to a power-saving mode when the information processing device has not operated for predetermined times is known.

In the normal power mode, power is supplied to both a main control unit and a communication unit of the information processing device. On the other hand, in the power-saving mode, the supply of the power to the main control unit is stopped and only the supply of the power to the communication unit is kept. Accordingly, in the power-saving mode, power consumption of the entire information processing device can be reduced compared with in the normal power mode.

In general, however, processes that functions in the power-saving mode are limited. Therefore, when the information processing device performs a process that does not function in the power-saving mode, it is necessary to return the power mode to the normal power mode in advance.

Here, to realize low power consumption in the information processing device, it is preferable to cause a time in which the information processing device operates in the power-saving mode to be as long as possible, that is, to cause a time in which the information processing device operates in the normal power mode to be as short as possible. To do so, it is preferable to reduce a frequency of return to the normal power mode in order to cause the main control unit to perform a process of which necessity is low, as much as possible.

As a technology for reducing the frequency of return to the normal power mode, for example, a technology of Japanese Unexamined Patent Publication No. 2014-113709 is known. In Japanese Unexamined Patent Publication No. 2014-113709, a discarding pattern (a condition that a received network packet is discarded) is preset. When a network packet is received in the power-saving mode in the information processing device, the network packet is compared to the discarding pattern. When the network packet matches the discarding pattern, the network packet is discarded without being processed. Therefore, in the information processing device of Japanese Unexamined Patent Publication No. 2014-113709, since there are fewer cases of returning from the power-saving mode to the normal power mode in order to allow the main control unit to perform a process corresponding to the discarding pattern, a time in which the information processing device operates in the normal power mode can be reduced. Therefore, it is possible to reduce power consumption.

As described above, in the technology of Japanese Unexamined Patent Publication No. 2014-113709, the discarding pattern is preset and stored in the information processing device. However, depending on a network environment in which the information processing device is installed, it may be difficult to accurately predict the type of network packet of which a reception frequency is high in some cases. In these cases, it is not easy to preset a discarding pattern for which an effect of reducing power consumption is considerably sufficient. Accordingly, when the information processing device of Japanese Unexamined Patent Publication No. 2014-113709 is used, a time during which the power-saving mode is maintained may not be sufficiently long, and therefore the power consumption may not be reduced sufficiently in some cases.

On the other hand, a method of obtaining the effect of sufficiently reducing power consumption by allowing a user or the like to analyze a network environment and to appropriately change and set a discarding pattern so that a time during which the power-saving mode is maintained is long is conceivable. However, it is not easy for a user or the like to analyze a type of network packet and determine a discarding pattern with a high benefit and a working burden necessary to change and set the discarding pattern may be excessive.

SUMMARY OF THE INVENTION

According to an embodiment of the present invention, an information processing device is operable in a plurality of power modes including a first power mode and a second power mode in which power consumption is less than power consumption of the first power mode. The information processing device includes a network interface and a controller. The controller receives a packet via the network interface and performs a process corresponding to the received packet when the information processing device operates in the first power mode. The network interface performs a process of transmitting the received packet to the controller when the information processing device operates in the first power mode, and performs a process of discarding the received packet or the process of transmitting the received packet to the controller when the information processing device operates in the second power mode. The network interface has a storage area in which a discarding determination pattern which is information used to determine whether the received packet is discarded or transmitted to the controller is stored. The controller performs a process of updating a list of the discarding determination pattern to be stored in the network interface based on determination of whether a process on the received packet in the controller is a discarding process.

Further features of the present invention will become apparent from the following description of exemplary embodiments with reference to the attached drawings.

DESCRIPTION OF THE EMBODIMENTS

Hereinafter, preferred modes for carrying out the present invention will be described with reference to the drawings. The following embodiments are not limited to the inventions described in the claims. Configurations described in the embodiments are not necessarily requisite elements of the present invention.

First Embodiment

Figure 1:
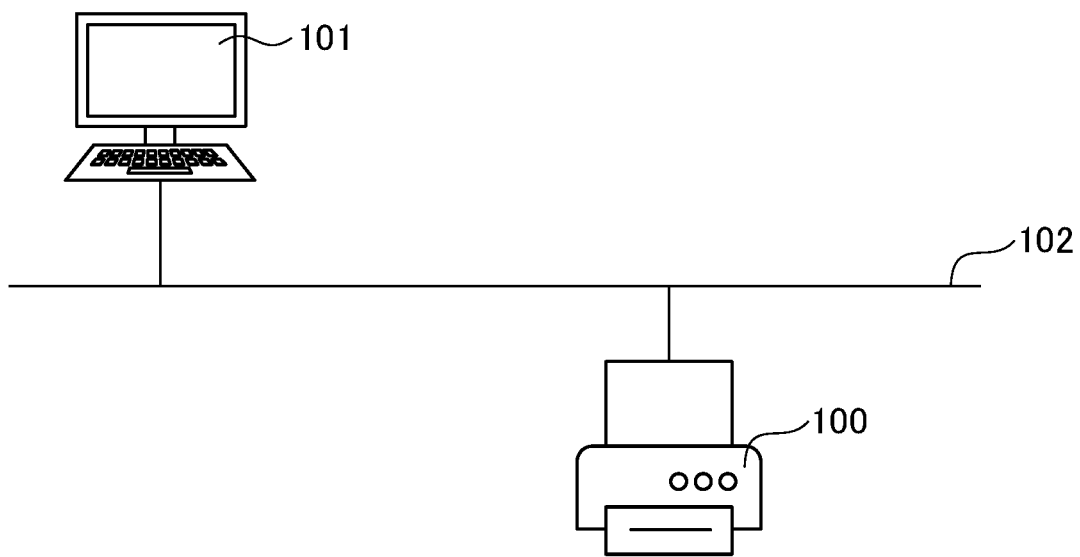
FIG. 1 is a conceptual diagram illustrating a network environment in which an information processing device according to a first embodiment is installed.

FIG. 1 illustrates an example of a network environment according to the embodiment.

The network environment illustrated in FIG. 1 includes an image forming device 100, a personal computer 101, and a network 102.

The image forming device 100 corresponds to an information processing device according to the present invention. As the image forming device 100, for example, a normal printer, a digital multi-function peripheral that has a copy function and a scan function, or the like can be used. Instead of the image forming device 100, another type of information processing device may be used.

The image forming device 100 performs a process of performing printing based on print data received from the personal computer 101, a process of transmitting device information (for example, information regarding a consumable or the like) in response to a request from the personal computer 101, and the like. In the embodiment, the image forming device 100 is in an environment in which the personal computer 101 can receive various packets flowing on the network 102 from a packet for communicating with a device other than the image forming device 100.

The personal computer 101 is an external device that communicates with the image forming device 100 via the network 102. Here, in the present invention, for example, any of other types of external devices such as a server computer may be used instead of the personal computer.

The network 102 connects the image forming device 100 to the personal computer 101 for communication. That is, the image forming device 100 and the personal computer 101 transmit and receive a network packet (hereinafter simply referred to as a 'packet_) via the network 102.

As the network 102, for example, the Internet, a local area network (L A N), or the like can be adopted.

Figure 2:
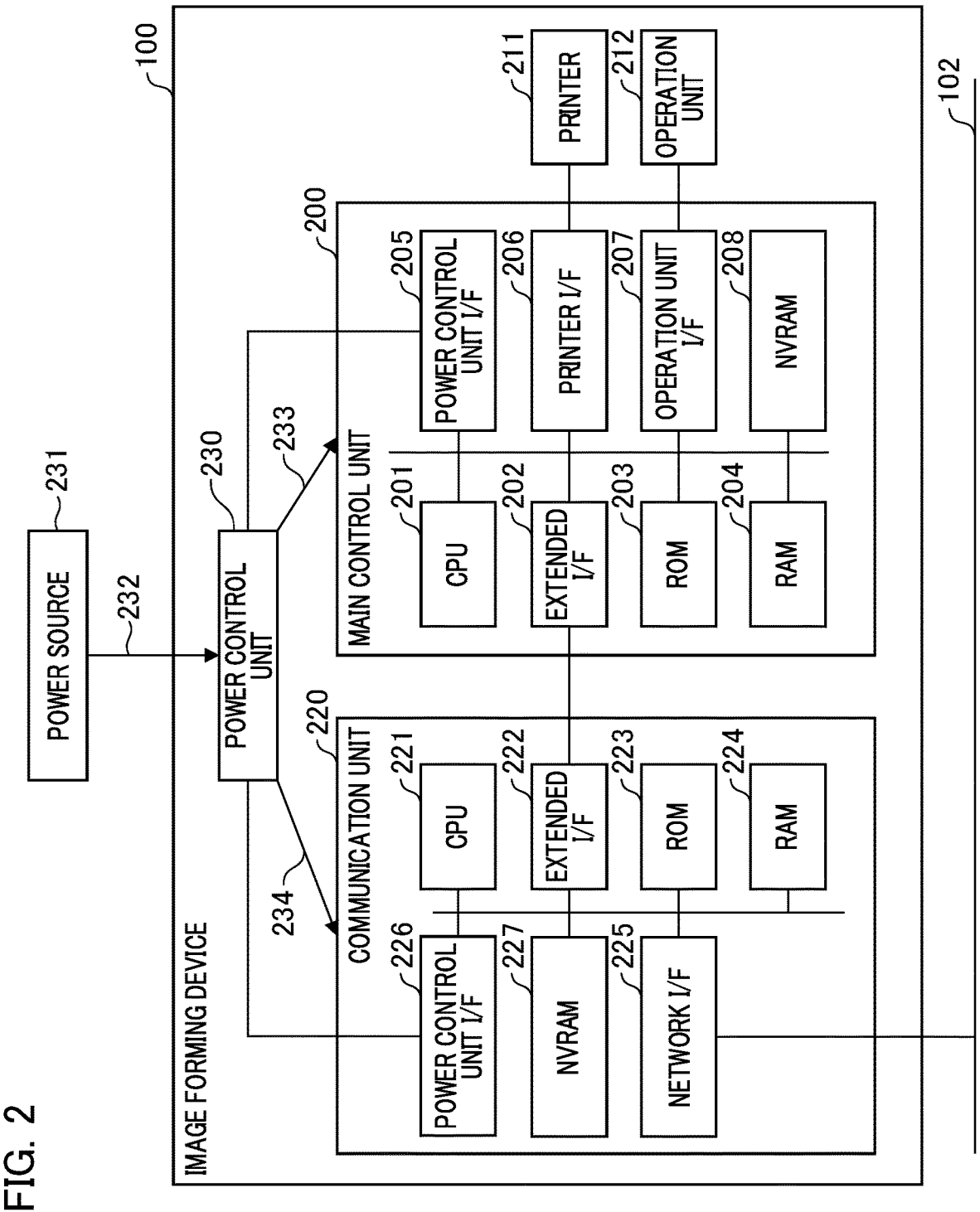
FIG. 2 is a block diagram schematically illustrating a hardware configuration of the information processing device according to the first embodiment.

FIG. 2 is a block diagram schematically illustrating a hardware configuration of the image forming device 100.

As illustrated in FIG. 2, the image forming device 100 according to the embodiment includes a main control unit 200, a printer 211, an operation unit 212, a communication unit 220, and a power control unit 230. Hereinafter, a configuration of each unit will be described.

The main control unit 200 includes a CPU 201, an extended I/F 202, a ROM 203, a RAM 204, a power control unit I/F 205, a printer I/F 206, an operation unit I/F 207, and an NVRAM 208. These units 201 to 208 are connected to be able to communicate with each other via communication bus.

The central processing unit (CPU) 201 controls an operation of the entire image forming device 100 by reading and executing a control program stored in the ROM 203.

The extended I/F 202 is an interface that performs communication with the communication unit 220.

The read-only memory (ROM) 203 stores the above-described control program or the like.

The random access memory (RAM) 204 is used as a temporary storage area (a main memory, a work area, or the like) of the CPU 201.

Here, the main control unit 200 of the image forming device 100 is assumed to perform each process illustrated in a flowchart to be described below using one CPU 201 and one memory (RAM 204). Here, the configuration of the main control unit 200 may be another form. For example, the process may be performed using a plurality of processors and a plurality of memories or the process may be performed by using another storage medium such as an HDD (not illustrated).

The power control unit I/F 205 is an interface that connects the main control unit 200 to the power control unit 230. As will be described below, an instruction to transition to a power-saving mode is transmitted from the main control unit 200 to the power control unit 230 via the power control unit I/F 205.

The printer I/F 206 is an interface that connects the main control unit 200 to the printer 211.

The operation unit I/F 207 is an interface that connects the main control unit 200 to the operation unit 212.

The nonvolatile RAM (NV RAM) 208 is a nonvolatile memory. The NVRAM 208 is used as a storage area used to store various kinds of information such as setting information of the image forming device 100.

The printer 211 performs a printing process based on a print command. The print data printed by the printer 211 is transmitted from the main control unit 200 to the printer 211 via the printer I/F 206.

The operation unit 212 includes a liquid crystal display unit that has a touch panel function and a keyboard. Information input by a user using the operation unit 212 is transmitted to the main control unit 200 via the operation unit I/F 207.

The communication unit 220 includes a CPU 221, an extended I/F 222, a ROM 223, a RAM 224, a network I/F 225, a power control unit I/F 226, and an NVRAM 227. These units 221 to 227 are connected to be able to communicate with each other via communication bus.

The communication unit 220 is configured as, for example, an independent system-on-a-chip (SoC). Here, a device such as a network interface card (NIC) that can be detachably mounted on the image forming device 100 may be used.

The main control unit 200 is connected to the network 102 via the communication unit 220. Thus, the main control unit 200 can communicate with an external device such as the personal computer 101.

The CPU 221 controls an operation of the communication unit 220 by reading and executing a control program stored in the ROM 223.

The extended I/F 222 is an interface that performs communication with the main control unit 200.

The ROM 223 stores the above-described control program or the like.

The RAM 224 is used as a temporary storage area (a main memory, a work area, or the like) of the CPU 221.

Here, the communication unit 220 is assumed to perform each process illustrated in a flowchart to be described below using one CPU 221 and one memory (RAM 224). Here, the configuration of the communication unit 220 may be another form. For example, the process may be performed using a plurality of processors and a plurality of memories or the process may be performed by using another storage medium such as an HDD (not illustrated).

The network I/F 225 is connected to the network 102. The network I/F 225 is connected to an external device such as the personal computer 101 via the network 102 to transmit and receive data. The data received via the network I/F 225 is processed by the CPU 221 to be transmitted to the main control unit 200.

The power control unit I/F 226 is an interface that connects the communication unit 220 to the power control unit 230. An instruction to return from a power-saving mode (equivalent to a 'second power mode_ of the present invention) to a normal power mode (equivalent to a 'first power mode_ of the present invention), as will be described below, is transmitted from the communication unit 220 to the power control unit 230 via the power control unit I/F 226.

The NVRAM 227 is a nonvolatile memory. The NVRAM 227 is used as a storage area used to store various kinds of information such as setting information of the communication unit 220.

The power control unit 230 is supplied with alternating-current power via a power supply line 232 by a power source 231. Then, the power control unit 230 converts the alternating-current power into direct-current power and then supplies the direct-current power to the main control unit 200 and the communication unit 220 via power supply lines 233 and 234. In the embodiment, the power control unit 230 also supplies the direct-current power to each of the printer 211 and the operation unit 213 via a power supply line (not illustrated).

The power control unit 230 controls power modes of the image forming device 100 based on an instruction to transition to the power-saving mode and an instruction to return to the normal power mode which are received from the power control unit I/Fs 205 and 226.

Next, the power modes of the image forming device 100 will be described with reference to Table 1. The image forming device 100 according to the embodiment has the normal power mode and the power-saving mode as two power modes.

At the time of an operation of the normal power mode, the power control unit 230 supplies power to both the main control unit 200 and the communication unit 220.

Table 1 shows that power is supplied to the printer 211 and the operation unit 213 in the case of an operation in the normal power mode. However, the present invention is not limited thereto. For example, also in the normal power mode, precise power saving control can be performed. In a specific example, in a case of a state in which printing can be performed immediately, such as during execution of printing, during preparation for printing, or a state in which a predetermined time has not passed from end of printing, control is performed such that power is supplied to the printer 211. In the case of transition to a standby state without a printing process having been performed for a given time, control is performed such that power is not supplied to the printer 211. When no operation is performed on the operation unit 213 for a predetermined time, control may be performed such that power is not supplied to the operation unit 213. In the embodiment, a state in which power is supplied to at least hardware of the main control unit 200 and the communication unit 220 is referred to as a normal power mode.

For example, power may be supplied normally to the printer 211 and the operation unit 213 irrespective of a selection result of the power mode. Separate use or non-use of the printer 211 and the operation unit 213 is detected. In the non-use state, the supply of the power may be stopped irrespective of a selection result of the power mode.

In this way, in the normal power mode, power is necessarily supplied to the main control unit 200 and the communication unit 220, and whether to supply power to the printer 211 or the operation unit 213 may be arbitrarily determined.

At the time of an operation of the normal power mode, as described above, the main control unit 200 performs a process on a packet received from an external device such as the personal computer 101. On the other hand, at the time of an operation of the power-saving mode, the communication unit 220 performs a process on the received packet instead of the main control unit 200.

When a packet is received during an operation in the power-saving mode, the communication unit 220 determines content of the process on the packet using a discarded pattern (equivalent to a 'discarding determination pattern_ of the present invention). Then, in accordance with the determination result, transition to a process in the power-saving mode or return to the normal power mode is performed. An operation of the image forming device 100 at the time of reception of a packet will be described later with reference to FIG. 4.

In the embodiment, a case in which it is alternatively selected whether a packet during an operation in the power-saving mode is discarded or the power mode returns to the normal power mode and the packet is processed is exemplified, but the present invention is not limited thereto. For example, in addition to this process, a proxy response process of transmitting a response packet in response to some types of received packets while the power-saving mode remains can also be performed using a proxy response pattern.

At the time of an operation of the power-saving mode, when the supply of the power to the main control unit 200 is completely stopped, information stored in a volatile memory such as the RAM 204 is lost. Therefore, in the embodiment some units of the main control unit 200 such as a nonvolatile memory are assumed to be supplied with power even in the power-saving mode. Here, information stored in the nonvolatile memory may be temporarily backed up to a nonvolatile memory such as the NVRAM 224 and the supply of the power to the main control unit 200 may be completely stopped.

TABLE 1

| | Whether to supply power by power mode corresponding to each unit | |
|---|---|---|
| | Normal power mode | Power-saving mode |
| Main control unit 200 | Supplied | Not supplied (partially removed) |
| Printer 211 | Supplied | Not supplied |
| Operation unit 212 | Supplied | Not supplied |
| Communication unit 220 | Supplied | Supplied |

Figure 3:
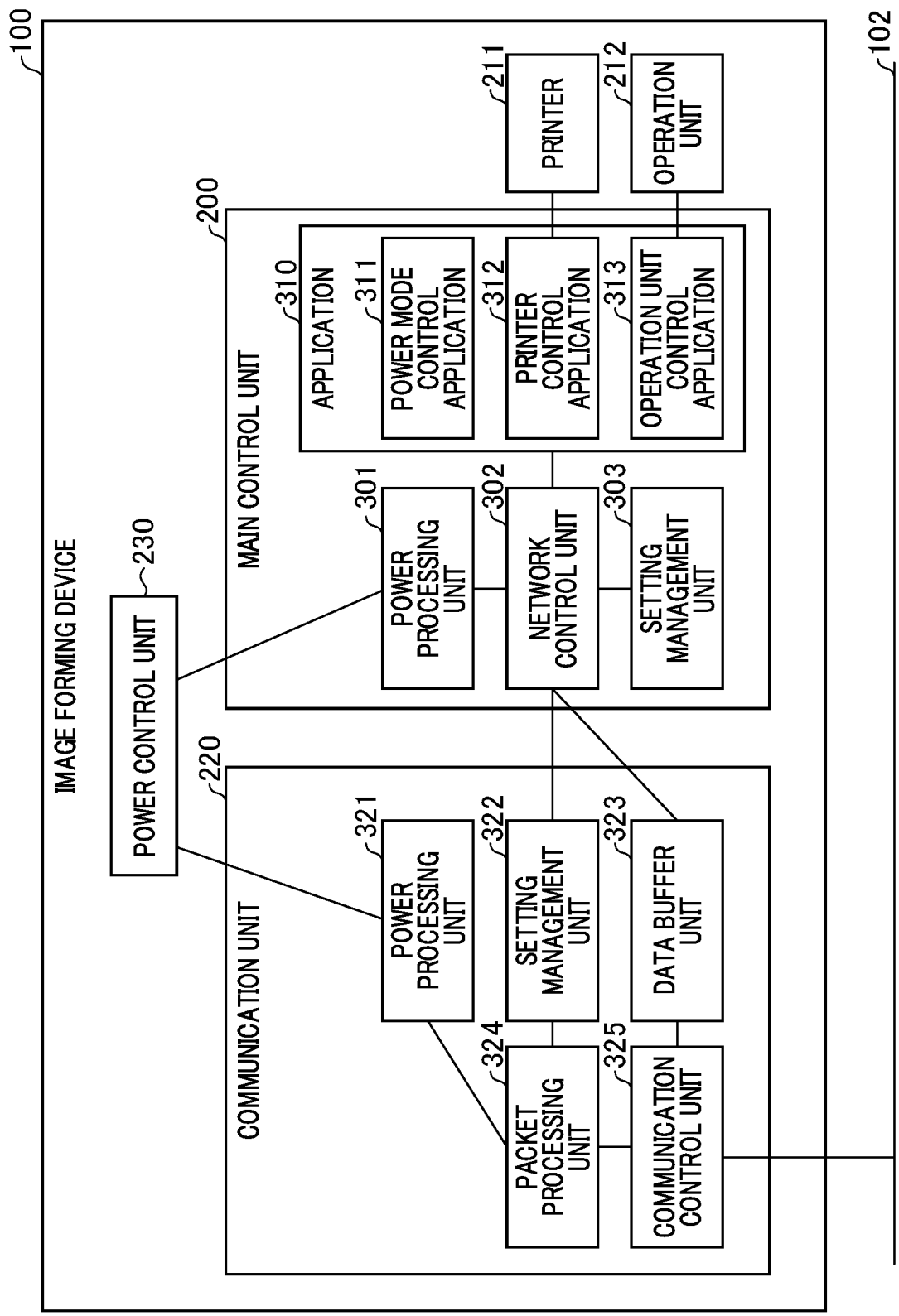
FIG. 3 is a block diagram schematically illustrating a software configuration of the information processing device according to the first embodiment.

FIG. 3 is a block diagram schematically illustrating a configuration of a software block of the image forming device 100. The software configuration illustrated in FIG. 3 is merely exemplary and the software configuration for realizing the present invention is not limited thereto.

As will be described below, the software configuration illustrated in FIG. 3 includes a software unit controlling the main control unit 200 and a software unit controlling the communication unit 220.

First, the main control unit 200 will be described.

As described above, the CPU 201 in the main control unit 200 reads a control program stored in the ROM 203 to the RAM 204 and executes the control program. In this way, the control on the main control unit 200 is performed.

The main control unit 200 includes a power processing unit 301, a network control unit 302, a setting management unit 303, and an application unit 310.

The power processing unit 301 performs communication with the power control unit 230. At the time of transition to the power-saving mode, an instruction to transition is transmitted from the power processing unit 301 to the power control unit 230.

The network control unit 302 controls communication between the main control unit 200 and the communication unit 220. For example, when the image forming device 100 performs communication with an external device such as the personal computer 101, packets are transmitted and received between the communication unit 220 and each of the other units of the main control unit 200 via the network control unit 302. At the time of transition to the power-saving mode, the network control unit 302 receives information used for the control program of the communication unit 220 to use in the operation of the power-saving mode from the setting management unit 303 and transmits the information. As the information transmitted by the network control unit 302, for example, there is setting information such as an IP address or a discarding pattern for determining whether to discard the received packet.

The setting management unit 303 controls a storing process or an outputting process for setting information or the like in or to a storage device such as the RAM 204 or the NVRAM 210. That is, the setting management unit 303 manages setting information (for example, an IP address or the like) regarding a network or information (for example, a discarding pattern or the like) regarding setting of an operation in the power-saving mode.

The application unit 310 is an application group realizing an advanced function of the image forming device 100. The application unit 310 includes a power mode control application 311, a printer control application 312, and an operation unit control application 313.

The power mode control application 311 determines whether to transition from the normal power mode to the power-saving mode. When the power mode control application 311 determines to transition to the power-saving mode, the power mode control application 311 instructs the power processing unit 301 to perform a process of transitioning to the power-saving mode. At this time, the power mode control application 311 further instructs the network control unit 302 to transmit the information (described above) used in the operation in the power-saving mode operation to the communication unit 220.

The power mode control application 311 analyzes a packet which is a cause of the return when the power mode returns from the power-saving mode to the normal power mode. When the power mode control application 311 determines that the packet is a packet which it is not necessary to process in the normal power mode, the power mode control application 311 generates a new discarding pattern based on an analysis result of the packet. The new discarding pattern is stored in the setting management unit 303 and is transmitted to the communication unit 220.

In the embodiment, the packet which is a cause of the return from the power-saving mode has been set as an analysis target, but another packet can also be set as analysis target in the present invention. For example, a packet received in the normal power mode, a packet received and buffered during the process of the return from the power-saving mode, or the like may be set as an analysis target.

The printer control application 312 receives print data transmitted from an external device such as the personal computer 101 via the network 102, the communication unit 220, and the network control unit 302. Then, the printer control application 312 transmits the print data after performing a process of enabling the print data to be printed in the printer 211. Thus, a printing process can be performed in the image forming device 100 based on an operation by a user on an external device. The printer control application 312 acquires various states of the printer 211, for example, information regarding a situation of execution of the printing process or a remaining amount of a consumable, and stores the various states in the setting management unit 303.

The operation unit control application 313 reads information stored in the setting management unit 303 and performs control such that the information is displayed on the operation unit 212. Further, the operation unit control application 313 performs control such that data input from the operation unit 212 by a user is stored in the setting management unit 303, performs control such that the data is transmitted to each control unit or application, and the like. That is, the operation unit control application 313 performs an inputting or outputting process to or from the image forming device 100.

Next, the communication unit 220 will be described.

As described above, the CPU 201 in the communication unit 220 reads a control program stored in the ROM 223 to the RAM 224 and executes the control program. Thus, the control on the communication unit 220 is performed.

The communication unit 220 includes a power processing unit 321, a setting management unit 322, a data buffer unit 323, a packet processing unit 324, and a communication control unit 325.

The power processing unit 321 performs communication with the power control unit 230. At the time of the return to the normal power mode, an instruction to return to the normal power mode is transmitted from the power processing unit 321 to the power control unit 230.

The setting management unit 322 controls a process of storing or outputting data in or from a storage device such as the RAM 224 or the NV RAM 227. That is, the setting management unit 322 writes information such as an IP address or a discarding pattern transmitted from the network control unit 302 on the RAM 224 or stores information such as a MAC address in the NVRAM 227.

The data buffer unit 323 is a storage area in which buffering is performed to cause the network control unit 302 to acquire a packet received by the communication unit 220.

The data buffer unit 323 temporarily stores information received from the network 102 to perform a hardware process. The information stored in the data buffer unit 323 can be accessed by the setting management unit 322 constructed by causing the communication unit 220 to execute the control program.

Additionally, when a process of returning the power mode from the power-saving mode to the normal power mode is performed, the data buffer unit 323 stores a packet which is a return determination target. Further, the data buffer unit 323 also temporarily stores a packet received by the communication unit 220 during the return process.

The packet processing unit 324 receives a packet received via the network 102 from the communication control unit 325 and analyzes the packet. At the time of the operation of the power-saving mode, the packet processing unit 324 compares the received packet with each discarding pattern included in a discarding pattern list. When the received packet matches any one of the discarding patterns, the packet processing unit 324 discards the received packet and maintains the power-saving mode. Conversely, when the received packet does not match any discarding pattern, the packet processing unit 324 notifies the power processing unit 321 of a command to return from the power-saving mode to the normal power mode.

Further, when a proxy response function is used, the packet processing unit 324 performs the following control.

The packet processing unit 324 determines whether the received packet is a packet which can be responded to by proxy at the time of the operation of the power-saving mode. When the packet processing unit 324 determines that the received packet matches the proxy response pattern in which a response corresponding to the packet is stored in advance, the packet processing unit 324 determines that the received packet is a packet which can be responded by proxy. When the received packet is the packet which can be responded by proxy, a response packet is transmitted to a transmission source of the received packet without returning to the normal power mode. An example of the proxy response will be described. For example, when an ARP packet is received, the packet processing unit 324 can respond with a MAC address without returning to the normal power mode.

The communication control unit 325 controls an operation of transmitting or receiving a packet via the network I/F 225. When the network I/F 225 receives a packet, the communication control unit 325 stores the received packet in the data buffer unit 323 and notifies the packet processing unit 324 that the packet is received. An operation of causing the network I/F 225 to send the packet to the network 102 is controlled by the communication control unit 325 irrespective of being in a time of the normal power mode or the time of the power-saving mode.

The printer 211, the operation unit 212, and the power control unit 230 operate when a CPU (not illustrated) provided inside executes a predetermined control program. The detailed description thereof will be omitted.

Figure 4:
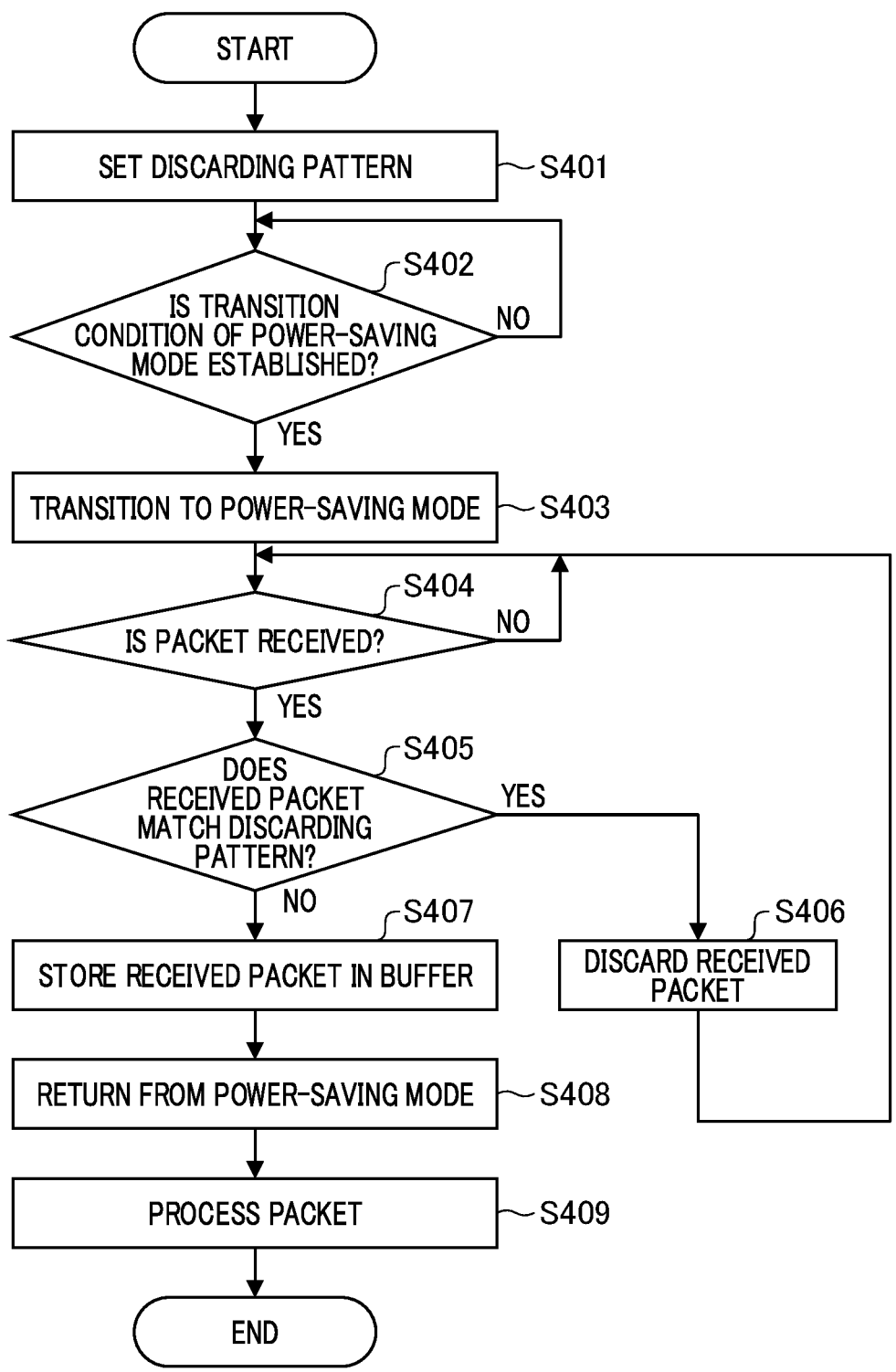
FIG. 4 is a flowchart illustrating a process related to a power-saving mode of the information processing device according to the first embodiment.

Hereinafter, a process of performing the transition to the power-saving mode and the return to the normal power mode will be described with reference to FIG. 4. The process is realized by causing the CPU 201, the CPU 221, and a CPU provided in each of the units 211, 212, and 230 execute a predetermined control program.

First, in the normal power mode, the power mode control application 311 reads information such as the discarding pattern or the IP address from the setting management unit 303. Then, from the read information, various parameters used in the communication unit 220 at the time of the power-saving mode are transmitted to the setting management unit 322 of the communication unit 220 via the network control unit 302. The setting management unit 322 performs a process of setting the received discarding pattern or the like (S401).

In the embodiment, a destination port number of a packet to be discarded is used as a discarding pattern. Here, information registered in the discarding pattern is not limited to the destination port number and may be any other kind of information as long as the information is information which can be acquired from the received packet.

An execution timing of the process (S401) of setting the discarding pattern or the like is not particularly limited as long as the execution timing is previous to the transition to the power-saving mode. For example, the process of S401 can be performed at the time of activation of the image forming device 100, immediately before the transition to the power-saving mode, or the like.

The process of S401 may be performed a plurality of times before the transition to the power-saving mode. When the process of S401 is performed a plurality of times, a setting result in the final process of S401 is valid.

Thereafter, the power mode control application 311 waits for establishment of a condition for transitioning to the power-saving mode (S402). For example, when the user operates the operation unit 212 to give an instruction to transition to the power-saving mode, the transition condition to the power-saving mode is determined to be satisfied. When the transition condition is determined to be satisfied, the power mode control application 311 instructs the power processing unit 301 to transition to the power-saving mode.

The power processing unit 301 transmits this instruction to the power control unit 230. In the power-saving mode, when the data stored in the volatile memory is evacuated to the nonvolatile memory (as described above), the power processing unit 301 evacuates the data and then transmits this instruction to the power control unit 230.

Thus, the power control unit 230 causes the power mode to transition from the normal power mode to the power-saving mode (S403).

When the transition to the power-saving mode is completed, the communication control unit 325 starts a packet reception waiting operation in the power-saving mode (S404). In the power-saving mode, when the communication control unit 325 receives the packet, the data of the received packet is temporarily stored in the data buffer unit 323.

When the data of the received packet is stored in the data buffer unit 323, the packet processing unit 324 compares the destination port number of the received packet with each discarding pattern stored in the setting management unit 322 (S405). As described above, in the embodiment, the destination port number of the packet is used as the discarding pattern.

When it is determined in S405 that the received packet matches the discarding pattern, the packet processing unit 324 discards the received packet (S406) and the packet reception waiting operation (S404) in the power-saving mode continues without interruption.

When the proxy response function is used, it is further determined whether the received packet matches the proxy response pattern before the determination of the discarding pattern is performed or after the determination of the discarding pattern is performed. When the received packet is determined to match the proxy response pattern, the packet processing unit 324 generates a response packet based on response data stored as the proxy response pattern and transmits the generated response packet to the transmission source of the received packet.

Conversely, when it is determined in S405 that the received packet does not match the discarding pattern, the packet processing unit 324 stores the received packet in a predetermined buffer area inside the data buffer unit 323 again (S407). That is, the received packet is moved to the buffer area which can be read by the main control unit 200 in the normal power mode. For example, the predetermined buffer area may be set as a buffering area dedicated for the received packet (that is, the packet matching the discarding pattern) which is a cause of return inside the data buffer unit 323. On the other hand, the data buffer unit 323 may be configured such that the main control unit 200 reads the data first temporarily stored in the buffer area.

Thereafter, the power control unit 230 transmits a return signal to the power processing unit 301 (that is, the CPU 201) of the main control unit 200. Thus, a process of returning the power mode to the normal power mode is performed as follows in the main control unit 200 (S408).

When the return signal is received from the power control unit 230, the power processing unit 301 notifies the power mode control application 311 of the return. When the power mode control application 311 receives the notification, the power mode control application 311 performs a process necessary for the return. At this time, the power mode control application 311 causes the other units 211 and 212 to perform the process necessary for the return. For example, by notifying the printer control application 312 of the return, the printer control application 312 is caused to perform a process of activating the printer 211. In the power-saving mode, when the data of the volatile memory is evacuated to the nonvolatile memory (as described above), the power processing unit 301 performs a process of writing back the evacuated data on the volatile memory.

When the return process on the side of the main control unit 200 is completed, the network control unit 302 acquires the packet which is the cause of return from the data buffer unit 323 and temporarily stores the packet. Besides, the network control unit 302 also acquires a packet newly received and stored in the middle of the process of returning to the normal power mode from the data buffer unit 323. A normal response process is performed on the packet received during the return process in response to the packet (S409).

Even when the received packet is the received packet which does not match the discarding pattern, there may also be a packet (that is, a packet inherently to be discarded) which is not inherently necessary to process. For example, when the destination port number stored in the received packet accords with a port number which is not open, reception of the packet is inherently not permitted. In this case, the received packet is discarded in the process of S409.

Figure 5:
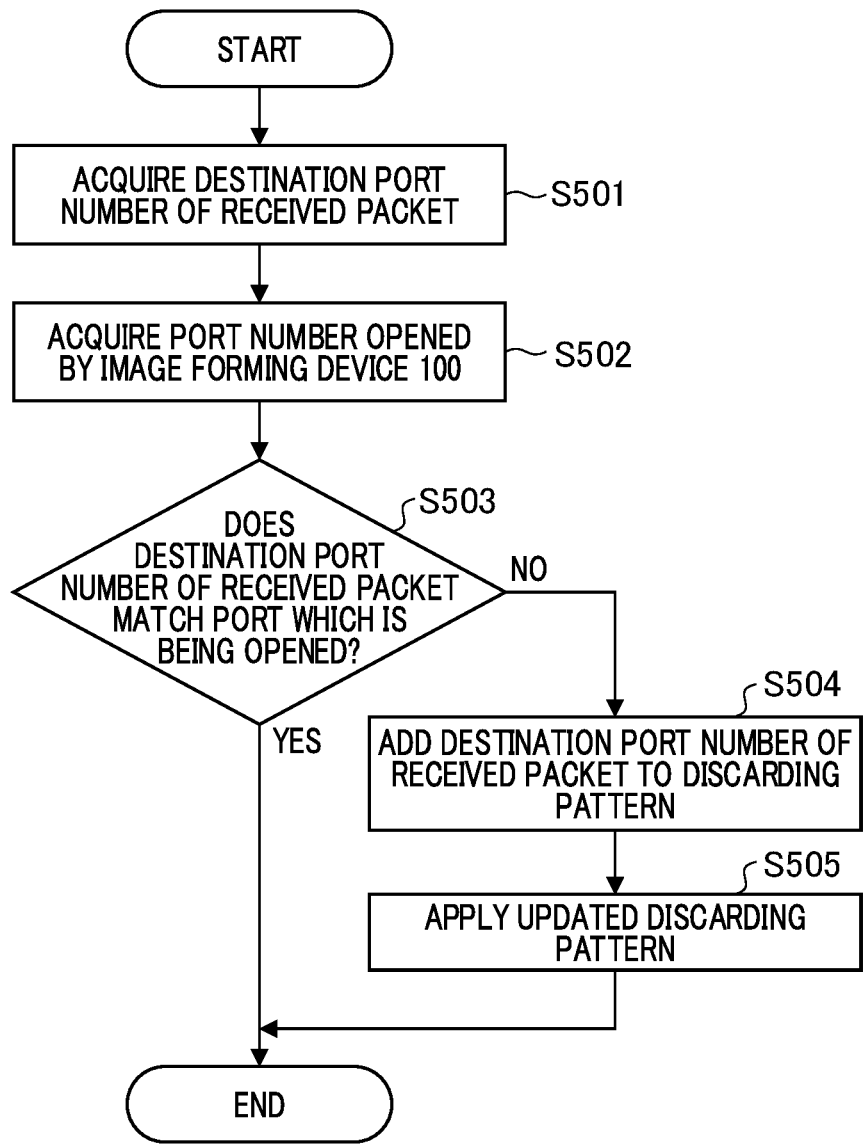
FIG. 5 is a flowchart illustrating a dynamic generation process for a discarding determination pattern according to the first embodiment.

Hereinafter, a process of generating a discarding pattern dynamically from a packet received by the image forming device 100 will be described with reference to FIG. 5.

After the process (S408) of returning to the normal power mode is completed, the power mode control application 311 acquires the packet which is the cause of return from the power-saving mode (S501). As described above (S409), the packet which is the cause of return is acquired by the network control unit 302 and is temporarily stored after the return process.

Subsequently, the power mode control application 311 acquires a list of destination port numbers which are currently opened from the network control unit 302 (S502). Then, the power mode control application 311 compares the destination port number of the packet which is the cause of return with the destination port number which is opened by the network control unit 302. Thus, it can be determined whether the destination port number stored in the packet which is the cause of return corresponds to the opened port (S503).

Here, when these port numbers does not accord with each other, the corresponding port is closed. In this case, the power mode control application 311 determines that the packet which is the cause of return is a packet which is inherently not necessary to process in the normal power mode. Then, the power mode control application 311 generates a new discarding pattern based on the destination port number stored in the packet. The generated discarding pattern is stored and managed by the setting management unit 303 (S504).

Subsequently, the power mode control application 311 resets various parameters used by the communication unit 220 at the time of the operation in the power-saving mode in the setting management unit 322 of the communication unit 220 (S505). At this time, the set parameters include at least the new discarding pattern generated in S504. That is, in the setting of S505, it is not necessary to reset all the parameters such as an IP address.

On the other hand, the destination port number registered as the discarding pattern is deleted in some cases. For example, when anew application is added to the application unit 310, a port which has not be used until then is opened and the port number has not to be the discarding pattern in some cases. Similarly, despite a change in various parameters or a change in a firmware version, the corresponding port number has not to be the discarding pattern in some cases.

Table 2 shows an example of a timing at which the discarding pattern is updated. As shown in Table 2, in the embodiment, not only the processing in which the newly generated discard pattern is added to the discard pattern list, but all or some of the discard patterns are deleted from the discard pattern list at a predetermined timing. Thus, the discarding patterns can dynamically be optimized.

TABLE 2

| Update timing of discarding pattern in first embodiment | |
|---|---|
| Add | Delete |
| at time of return from power-saving mode | at time of increasing newly operated application at time of initialization of setting at time of execution of firmware version-up/down |

As described above, according to the embodiment, the image forming device 100 can be caused to dynamically generate a discarding pattern using a packet actually flowing on the network 102. Accordingly, even in an environment in which a change beneficent in the power mode is difficult only in the discarding patterns prepared in advance, it is possible to sufficiently reduce power consumption of the image forming device 100.

Second Embodiment

In the above-described first embodiment, the main control unit 200 determines whether it is necessary to add a discarding pattern. When the main control unit 200 determines to add the discarding pattern, the main control unit 200 adds the discarding pattern to the communication unit 220, as described above. On the other hand, in the embodiment, an example in which a non-discarding pattern (equivalent to a 'discarding determination pattern_ of the present invention) with which it is determined whether a received packet is discarded is generated in the communication unit 220 will be described.

In the above-described first embodiment, the port number which is closed is set as the discarding pattern in the setting management unit 322. On the other hand, in the embodiment, the port number which is opened is set as a non-discarding pattern in the setting management unit 322. Therefore, in the embodiment, the communication unit 220 can perform a process of determining whether to discard a packet although additional setting for determining whether to discard the packet is not received from the main control unit 200. As a result, according to the embodiment, the non-discarding pattern can be updated even in the power-saving mode.

A network environment (see FIG. 1), a hardware configuration (see FIG. 2), and a software configuration (see FIG. 3) of the image forming device 100 used in the embodiment are similar to those of the above-described first embodiment.

Figure 6:
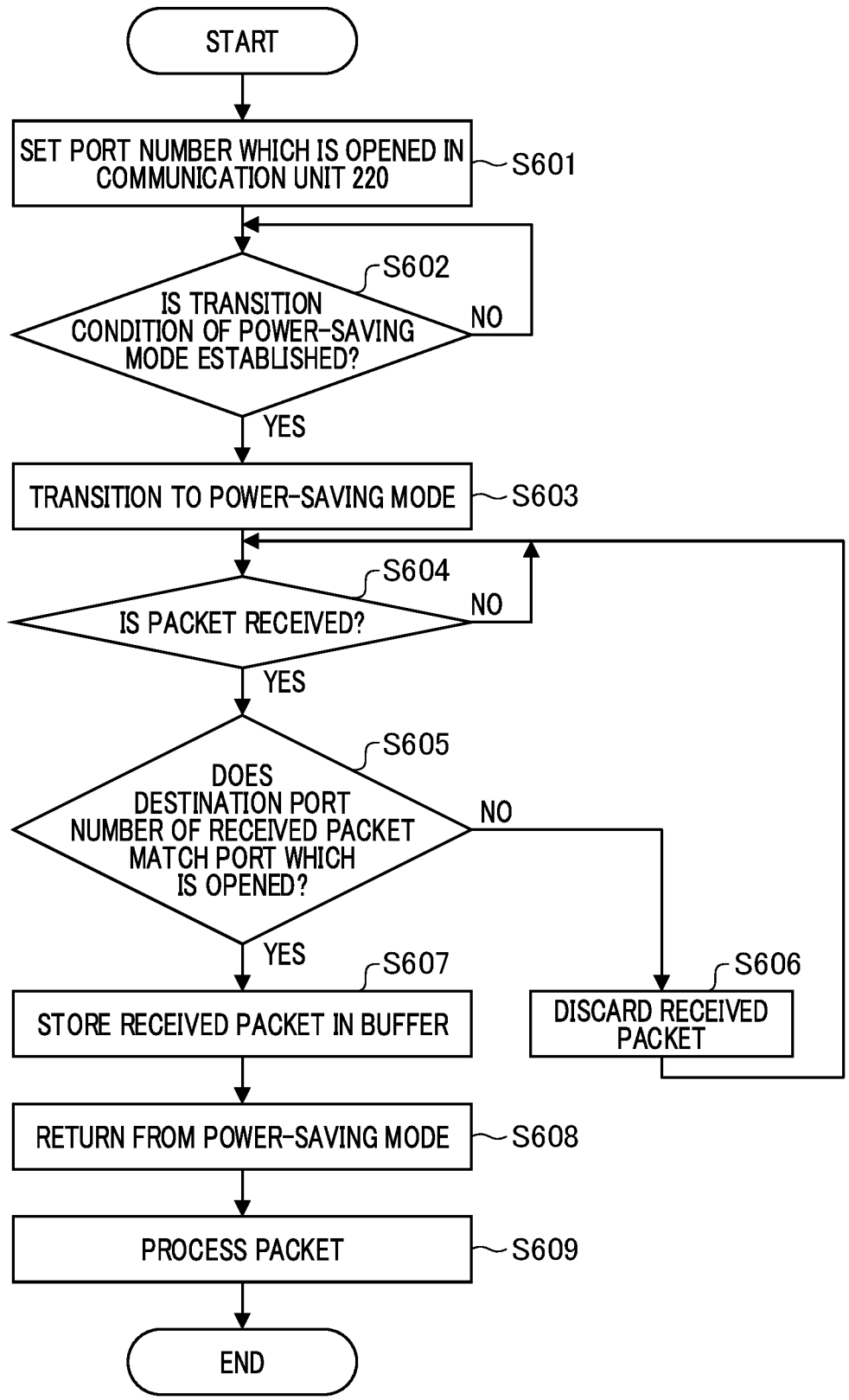
FIG. 6 is a flowchart illustrating a dynamic generation process for a discarding determination pattern according to a second embodiment.

Hereinafter, processes of performing transition to the power-saving mode and a return to the normal power mode will be described with reference to FIG. 6. As described above, the process is realized by causing the CPU 201, the CPU 221, and a CPU provided in each of the units 211, 212, and 230 execute a predetermined control program.

First, the power mode control application 311 sets parameters used for the communication unit 220 to operate in the setting management unit 322 via the network control unit 302. In the embodiment, when the parameters are set, port numbers opened at that time are also set (S601).

The process of setting the parameters can be performed at any timing before the transition to the power-saving mode. For example, this process may be performed at the time of activation of the image forming device 100, immediately before the transition to the power-saving mode, or the like. Further, this process may be performed at a timing at which various applications of the application unit 310 newly open reception ports.

The process of S601 may be performed a plurality of times before the transition to the power-saving mode. When the process of S601 is performed the plurality of times, a setting result in the final process of S601 is valid.

Then, the power mode control application 311 waits for establishment of a condition for transitioning to the power-saving mode (S602). For example, when the user operates the operation unit 212 to give an instruction to transition to the power-saving mode, the transition condition to the power-saving mode is determined to be satisfied. When the transition condition is determined to be satisfied, the power mode control application 311 instructs the power processing unit 301 to transition to the power-saving mode.

The power processing unit 301 transmits this instruction to the power control unit 230. In the power-saving mode, when the data stored in the volatile memory is evacuated to the nonvolatile memory, the power processing unit 301 evacuates the data and then transmits this instruction to the power control unit 230.

Thus, the power control unit 230 causes the power mode to transition from the normal power mode to the power-saving mode (S603).

When the transition to the power-saving mode is completed, the communication control unit 325 starts a packet reception waiting operation in the power-saving mode (S604). In the power-saving mode, when the communication control unit 325 receives the packet, the data of the received packet is temporarily stored in the data buffer unit 323.

When the data of the received packet is temporarily stored in the data buffer unit 323, the packet processing unit 324 compares the destination port number of the received packet with the non-discarding pattern stored in the setting management unit 322 (S605).

When it is determined in S605 that the received packet does not match the non-discarding pattern, the packet processing unit 324 discards the received packet (S606) and the packet reception waiting operation (S604) in the power-saving mode continues without interruption.

Conversely, when it is determined in S605 that the received packet matches the non-discarding pattern, the packet processing unit 324 stores the received packet in a predetermined buffer area inside the data buffer unit 323 again (S607). That is, the received packet is moved to the buffer area in which the main control unit 200 can perform a reading operation in the normal power mode. For example, the predetermined buffer area may be set as a buffering area dedicated for the received packet (that is, the packet matching the non-discarding pattern) which is a cause of return inside the data buffer unit 323. On the other hand, the data buffer unit 323 may be configured such that the main control unit 200 reads the data first temporarily stored in the buffer area.

When a proxy response is performed, a process of determining whether to match the proxy response pattern before or after the determination of the non-discarding pattern or the proxy response process is assumed to be performed. Since content of the process is similar to that of the first embodiment, the content of the process will be omitted.

Thereafter, the power control unit 230 transmits a return signal to the power processing unit 301 (that is, the CPU 201) of the main control unit 200. Thus, a process of returning the power mode to the normal power mode is performed as follows in the main control unit 200 (S608).

When the return signal is received from the power control unit 230, the power processing unit 301 notifies the power mode control application 311 of the return. When the power mode control application 311 receives the notification, the power mode control application 311 performs a process necessary for the return. At this time, the power mode control application 311 causes the other units 211 and 212 to perform the process necessary for the return. For example, by notifying the printer control application 312 of the return, the printer control application 312 is caused to perform a process of activating the printer 211. In the power-saving mode, when the data of the volatile memory is evacuated to the nonvolatile memory (as described above), the power processing unit 301 performs a process of writing back the evacuated data on the volatile memory.

When the return process on the side of the main control unit 200 is completed, the network control unit 302 acquires the packet which is the cause of return from the data buffer unit 323 and temporarily stores the packet. Besides, the network control unit 302 also acquires a packet newly received and stored in the middle of the process of returning to the normal power mode from the data buffer unit 323. A normal response process is performed on the packet received during the return process in response to the packet (S609).

In the embodiment, similarly to the above-described first embodiment (see FIG. 5), the received packet (that is, the received packet discarded by the communication unit 220) which is not processed by the main control unit 200 at the time of the power-saving mode can be determined. While anew discarding pattern is generated so that the received packet determined not to be processed is set as a discarding target in the first embodiment, however, the list of the non-discarding patterns is changed so that the received packet determined not to be processed is not included in the embodiment.

In the embodiment, similarly to the above-described first embodiment, the destination port number registered as the non-discarding pattern is added or deleted in some cases. For example, when a new application is added to the application unit 310, a port which has not used until then is opened in some cases. On the other hand, the non-discarding pattern has to be deleted by changing various parameters or changing a firmware version in some cases.

Table 3 shows an example of a timing at which the non-discarding pattern is updated. As shown in Table 3, in the embodiment, by performing a process of adding a non-discarding pattern or a process of deleting the non-discarding pattern, it is possible to dynamically optimize the non-discarding pattern.

TABLE 3

Update timing of non-discarding pattern in second embodiment

| Add | Delete |
| --- | --- |
| at time of reception of packet in power-saving mode at time of increase in newly operating application | at time of initialization of setting at time of execution of firmware version-up/down |

As described above, according to the embodiment, the image forming device 100 can be caused to dynamically generate a non-discarding pattern using a packet actually flowing on the network 102. Accordingly, even in an environment in which a change beneficent in the power mode is difficult only in the non-discarding patterns prepared in advance, it is possible to sufficiently reduce power consumption of the image forming device 100.

OTHER EMBODIMENTS

In the above-described first and second embodiments, the destination port number of the packet received by the image forming device 100 has been used as the discarding determination pattern. However, packet header information such as an IP version (for example, IPv4 or IPv6) or a type of protocol (TCI/IP or ICMP) can also be used as a discarding determination pattern in an embodiment of the present invention. Further, information included in a data payload of a packet may be used as a discarding determination pattern.

In the above-described first and second embodiments, update timings of the discarding determination pattern are determined as shown In Table 2 or 3, but the updating may be performed at any timing. For example, the application unit 310 may perform the updating whenever Open/Close of a reception port is switched. Thus, even when the process of updating the discarding determination pattern starts in a state in which an application corresponding to the received packet is activated, the discarding determination pattern can be reliably updated. Therefore, the received packet necessary for a process in the image forming device 100 may not be wrongly determined to be unnecessary.

When the setting of the device is initialized or firmware, control software, or the like of the image forming device 100 is updated, all of the discarding determination patterns added until then may be deleted and only the discarding determination patterns set in the initial state may remain.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)ù), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-112198, filed Jun. 17, 2019 which is hereby incorporated by reference wherein in its entirety.

What is claimed is:

1. An information processing device that is operable in a plurality of power modes including a first power mode and a second power mode in which power consumption is less than power consumption of the first power mode, the information processing device comprising:

a network interface; and a controller, wherein the controller receives a packet via the network interface and performs a process corresponding to the received packet when the information processing device operates in the first power mode, wherein the network interface performs a process of transmitting the received packet to the controller when the information processing device operates in the first power mode, and performs a process of discarding the received packet or the process of transmitting the received packet to the controller when the information processing device operates in the second power mode, wherein the network interface has a storage area in which a discarding determination pattern which is information used to determine whether the received packet is discarded or transmitted to the controller is stored, wherein the controller performs a process of updating a list of the discarding determination pattern to be stored in the network interface based on determination of whether a process on the received packet in the controller is a discarding process, wherein the discarding determination pattern is a pattern in which a packet matching the discarding determination pattern is discarded, wherein the network interface performs a process of discarding the received packet when predetermined packet information stored in the received packet accords with the discarding determination pattern, and wherein the controller generates a new discarding determination pattern based on the received packet and updates the discarding determination pattern of the storage area of the network interface when the process on the received packet transmitted from the network interface in the controller is the discarding process.

2. The information processing device according to claim 1, further comprising:

a power control unit, wherein, when the information processing device operates in the second power mode, the network interface transmits a signal for switching a power mode of the information processing device to the first power mode to inside of the information processing device in accordance with determination that the received packet is transmitted to the controller.

3. The information processing device according to claim 1, wherein the network interface further includes a data buffer unit that temporarily stores the received packet, and wherein the received packet temporarily stored in the data buffer unit is acquired by the controller after the information processing device transitions to the first power mode.

4. The information processing device according to claim 1, wherein the predetermined packet information is a destination port number.

5. The information processing device according to claim 4, wherein the discarding determination pattern stored in the storage area is updated when a new application program is installed in the controller.

6. The information processing device according to claim 1, wherein the predetermined packet information is information indicating an IP version.

7. The information processing device according to claim 1, wherein the predetermined packet information is information indicating a type of Internet protocol.

8. The information processing device according to claim 1, wherein the predetermined packet information is information stored in a data payload of the packet.

9. The information processing device according to claim 1, wherein, when the information processing device operates in the first power mode, the network interface performs a process of transmitting the received packet acquired via the network to the controller and the controller performs a process determined in accordance with the received packet received from the network interface, and wherein, when the information processing device operates in the second power mode, the network interface performs a process of discarding the received packet without transmitting the received packet to the controller or performs a process of transmitting a signal for switching the power mode of the information processing device to the first power mode to inside of the information processing device and transmitting the received packet to the controller.

10. The information processing device according to claim 1, wherein, in the storage area of the network interface, a proxy response pattern for performing a response to the received packet while maintaining the second power mode is further stored, and wherein the network interface further generates a response packet and performs a transmission process of transmitting the generated response packet to a transmission source of the received packet when the received packet is a received packet matching the proxy response pattern.

11. The information processing device according to claim 1, wherein the information processing device is a printing device that includes a printing unit.

12. A method of controlling an information processing device that includes a network interface and a controller and is operable in a plurality of power modes including a first power mode and a second power mode in which power consumption is less than power consumption of the first power mode, the method comprising:

receiving, by the controller, a packet via the network interface and performing control such that a process corresponding to the received packet is performed when the information processing device operates in the first power mode;

performing control, by the network interface, such that a process of transmitting the received packet to the controller is performed when the information processing device operates in the first power mode; and performing control, by the network interface, such that a process of discarding the received packet or the process of transmitting the received packet to the controller is performed when the information processing device operates in the second power mode, wherein the network interface has a storage area in which a discarding determination pattern which is information used to determine whether the received packet is discarded or transmitted to the controller is stored, and wherein the controller performs control such that a process of updating a list of the discarding determination pattern to be stored in the network interface is performed based on determination of whether a process on the received packet in the controller is a discarding process, wherein the discarding determination pattern is a pattern in which a packet matching the discarding determination pattern is discarded, wherein a process of discarding the received packet is performed by the network interface when predetermined packet information stored in the received packet accords with the discarding determination pattern, and wherein a new discarding determination pattern is generated based on the received packet and the discarding determination pattern of the storage area of the network interface is updated when the process on the received packet transmitted from the network interface is the discarding process.

13. An information processing device that is operable in a plurality of power modes including a first power mode and a second power mode in which power consumption is less than power consumption of the first power mode, the information processing device comprising:

a network interface; and a controller, wherein the controller receives a packet via the network interface and performs a process corresponding to the received packet when the information processing device operates in the first power mode, wherein the network interface performs a process of transmitting the received packet to the controller when the information processing device operates in the first power mode, and performs a process of discarding the received packet or the process of transmitting the received packet to the controller when the information processing device operates in the second power mode, wherein the network interface has a storage area in which a discarding determination pattern which is information used to determine whether the received packet is discarded or transmitted to the controller is stored, wherein the controller performs a process of updating a list of the discarding determination pattern to be stored in the network interface based on determination of whether a process on the received packet in the controller is a discarding process, wherein the discarding determination pattern is a pattern in which a packet not matching the discarding determination pattern is discarded, wherein the network interface performs a process of discarding the received packet when predetermined packet information stored in the received packet does not accord with the discarding determination pattern, and wherein the controller deletes the discarding determination pattern from storage area when the process on the received packet in the controller is a discarding process.

14. The information processing device according to claim 13, wherein the predetermined packet information is a destination port number.

15. The information processing device according to claim 14, wherein the discarding determination pattern stored in the storage area is updated when a new application program is installed in the controller.

16. The information processing device according to claim 13, wherein the predetermined packet information is information indicating an IP version.

17. The information processing device according to claim 13, wherein the predetermined packet information is information indicating a type of Internet protocol.

18. The information processing device according to claim 13, wherein the predetermined packet information is information stored in a data payload of the packet.

* * * * *